March 27, 1934.  H. V. REED  1,952,892

CLUTCH PLATE

Filed April 24, 1929

Inventor:-
Harold V. Reed
By Wm. O. Belt
Atty.

Patented Mar. 27, 1934

1,952,892

UNITED STATES PATENT OFFICE 1,952,892

CLUTCH PLATE

Harold V. Reed, Chicago, Ill., assignor to The Borg & Beck Company, Chicago, Ill., a corporation of Illinois Application April 24, 1929, Serial No. 357,817

8 Claims. (Cl. 192—68)

This invention relates to clutch plates of the kind which are gripped or clamped between two parts of a driving member of a friction clutch under sufficient pressure to impart motion from the driving member to the driven member of the clutch, and are provided with spring cushions between said parts to absorb and to prevent the transmission of vibrations from the engine through the clutch.

The object of the invention is to enable the formation of the spring cushion by the use of light springs, thereby avoiding the necessity for using heavy springs which are more likely to break than light springs under the conditions of service.

And a further object of the invention is to provide novel and simple means for securely and rigidly mounting the disk and the side plates forming the spring housing on the hub.

In the accompanying drawing I have illustrated a selected embodiment of the invention.

Figures 1, 2:
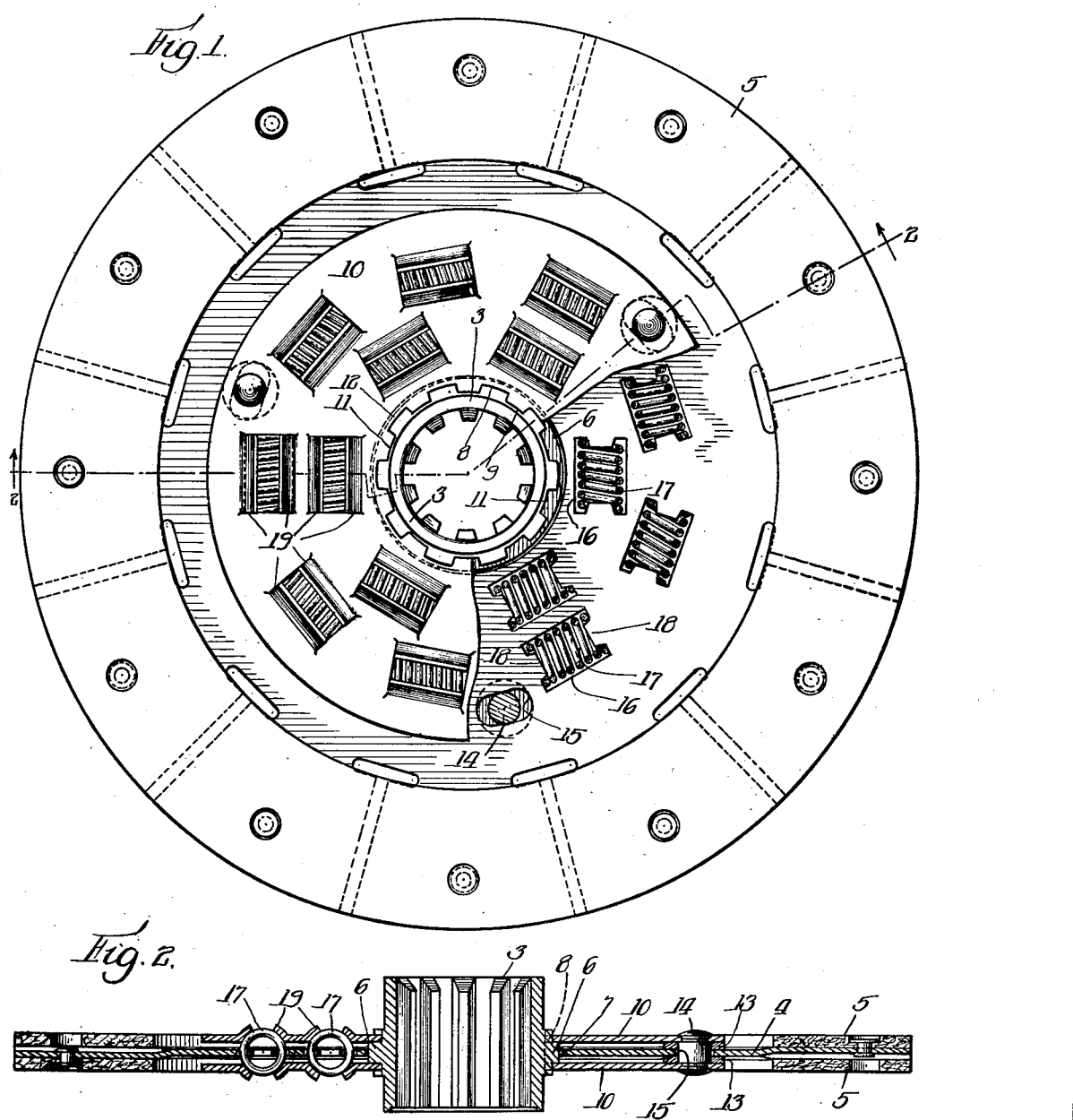
Fig. 1 is a side elevation with one side plate partly broken away.
Fig. 2 is a sectional view on the line 2—2 of Fig. 1.

Referring to the drawing 3 is the hub and 4 is the disk which carries the friction rings or facings 5. The disk 4 is stamped from sheet metal and may be in any form or shape suitable for the purpose. Also the friction rings may be of any suitable kind or material, they may be continuous or discontinuous and fastened to the disk, or they may be continuous and free from the disk. The hub has a small annular flange 6 and the disk has an opening 7 to receive the flange. Shoulders 8 are provided at each side of the flange and these shoulders are spaced apart to provide recesses 9 therebetween. Side plates 10 are made rigid with the hub and they are provided with central openings the edges of which have alternate projections 11 and notches 12 to interengage the shoulders 8 whereby the side plates are rigidly mounted on the hub to form a hub member and to rotate therewith. Washers 13 are interposed at intervals between the disk and the side plates and rivets 14 or other suitable devices pass through the side plates, washers and disk to secure these parts together. The openings 15 in the disk to receive the rivets are elongated to permit relative movement of the disk and side plates and they limit this movement to prevent the springs from being unduly compressed by excessive load on the clutch plate. The flange and the washers cooperate to space the side plates apart. The rivets hold the side plates on the hub against the interposed flange whereby lateral displacement of the disk and side plates is prevented. The disk is provided with a plurality of openings 16 to receive the springs 17, the end walls of the openings having projections 18 to enter the ends of the springs. The side plates are provided with openings 19 which register with the openings 16, the edges of these openings 19 being bent outward to provide housings for the springs. The springs are arranged in two concentric rows and as many may be provided as desired and conditions will permit. If only a few springs are employed for the spring cushion it is necessary to provide relatively strong springs which are more apt to break in service than lighter springs. I contemplate the use of a large number of relatively light springs to reduce the unit stress on each spring and they may be arranged in concentric rows or otherwise as desired. This invention reduces the number of parts required for a cushion clutch plate except for the number of springs which are multiplied to enable the use of lighter springs and reduce the unit stress on each spring. The disk and side plates are mounted on the hub in a novel and simple manner facilitating manufacture and assembly of parts and decreasing weight and cost. The rivets and springs provide for a yielding connection between the disk and side plates whereby the springs form a cushion and the compression thereof is limited to avoid damage thereof under excessive loads; and the interengaging parts on the hub and side plates provide a strong, efficient and rigid connection therebetween.

I have illustrated and described a selected embodiment of my invention, but it is to be understood that variations and modifications may be made therein and I therefore do not wish to be limited to the precise details set forth but reserve the right to make all changes and modifications as fall within the scope of the following claims.

I claim:

1. A clutch plate comprising a hub having a series of annular spaced shoulders, a disk having an opening to receive the hub between the shoulders, side plates having a driving engagement with said shoulders, and means extending through openings in the disk for securing together the side plates for limited movement relative to the disk.

2. A clutch plate comprising a hub having a series of annular spaced shoulders, a disk having an opening to receive the hub between the shoulders, side plates having notches and projections providing a driving engagement with said shoulders, and means extending through openings in the disk for securing together the side plates for limited movement relative to the disk.

3. A clutch plate comprising a hub, a friction member, a pair of side plates having driving engagement with the hub, means extending through openings in the friction member for securing together the side plates for limited movement relative to the friction member, said member and said plates having a plurality of registered openings therein disposed in different radial positions about the centers thereof, and springs in said openings between the walls thereof adapted to limit relative movement of said side plates to said friction member.

4. A clutch plate comprising a hub, a friction member, a pair of side plates arranged on opposite sides of the friction member and having driving engagement with the hub, means extending through openings in the friction member for securing together the side plates, said member and said plates having a plurality of concentric rows of registered openings, and springs held in said openings between the walls thereof for limiting relative movement of the side plates to the friction member.

5. A clutch plate comprising a hub, a friction member, a pair of side plates having driving engagement with the hub, means extended through openings in the friction member for interconnecting the side plates for movement relative to the friction member, and spacing means localized about the connecting means and contacting with the side plates and with both sides of the friction member for spacing said side plates from said friction member.

6. A clutch plate comprising a hub, a pair of side plates forming a hub member, a friction member arranged on the hub and between the side plates, one of said members having a driving engagement with the hub, means extending parallel with the axis of the friction member and fixedly mounted in one member and loosely mounted in the other member to connect said members and permit free movement of one member rotatively and relatively to the other member, and spiral springs independent of the connecting means controlling said movement.

7. A clutch plate comprising a hub, a pair of side plates forming a hub member, a friction member arranged on the hub and between the side plates, one of said members having a driving engagement with the hub, said friction member having a slot therein, means secured in said side plates and extending through said slot to connect the members and permit limited movement of one member rotatively and relatively to the other member, and spiral springs independent of the connecting means controlling said movement.

8. A clutch plate comprising a hub, a pair of side plates forming a hub member, a friction member arranged on the hub and between the side plates, one of said members having a driving engagement with the hub, said friction member having a slot therein, means secured in said side plates and extending through said slot to connect the members and permit limited movement of one member rotatively and relatively to the other member, and spacing means localized about said connecting means and contacting with the side plates and with both sides of the friction member for spacing the side plates from the friction member.

HAROLD V. REED.